(12) United States Patent
Haas et al.

(10) Patent No.: US 7,015,479 B2
(45) Date of Patent: Mar. 21, 2006

(54) DIGITAL FILM GRAIN

(75) Inventors: Daniel D. Haas, Webster, NY (US); William E. Moore, Macedon, NY (US); Timothy J. Tredwell, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 288 days.

(21) Appl. No.: 10/631,092

(22) Filed: Jul. 31, 2003

(65) Prior Publication Data

US 2005/0023476 A1    Feb. 3, 2005

(51) Int. Cl.
*G01T 1/24* (2006.01)
(52) U.S. Cl. ................................. 250/370.11
(58) Field of Classification Search ........... 250/370.11, 250/370.09; 235/492
See application file for complete search history.

(56) References Cited

U.S. PATENT DOCUMENTS

| | | |
|---|---|---|
| 2,303,942 A | 12/1942 | Lane et al. |
| 3,418,246 A | 12/1968 | Royce |
| 3,428,247 A | 2/1969 | Andresen et al. |
| 3,591,516 A | 7/1971 | Rabatin |
| 3,607,770 A | 9/1971 | Rabatin |
| 3,617,743 A | 11/1971 | Rabatin |
| 3,666,676 A | 5/1972 | Rabatin et al. |
| 3,725,704 A | 4/1973 | Buchanan et al. |
| 3,778,615 A | 12/1973 | Luckey |
| 3,795,814 A | 3/1974 | Rabatin |
| 3,974,389 A | 8/1976 | Ferri et al. |
| 4,032,471 A | 6/1977 | Luckey |
| 4,225,653 A | 9/1980 | Brixner |
| 4,311,487 A | 1/1982 | Luckey et al. |
| 4,387,141 A | 6/1983 | Patten |
| 4,405,691 A | 9/1983 | Yale |
| 4,730,188 A | 3/1988 | Milheiser |
| 4,835,397 A | 5/1989 | Arakawa et al. |
| 4,865,944 A | 9/1989 | Roberts et al. |
| 4,988,880 A | 1/1991 | Bryan et al. |
| 4,988,881 A | 1/1991 | Bryan et al. |
| 4,994,205 A | 2/1991 | Bryan et al. |
| 4,994,355 A | 2/1991 | Dickerson et al. |
| 4,997,750 A | 3/1991 | Dickerson et al. |
| 5,021,327 A | 6/1991 | Bunch et al. |
| 5,053,774 A | 10/1991 | Schuermann et al. |
| 5,064,729 A | 11/1991 | Zegarski |
| 5,095,218 A | 3/1992 | Bryan et al. |

(Continued)

FOREIGN PATENT DOCUMENTS

EP          491116 B1      8/1991

(Continued)

OTHER PUBLICATIONS

Research Discloser, vol. 184, Item 18431, Section IX, X-ray Screens/Phosphors.

(Continued)

*Primary Examiner*—David Porta
*Assistant Examiner*—Mindy Vu
(74) *Attorney, Agent, or Firm*—Nelson Adrian Blish

(57) ABSTRACT

A digital film grain (20) comprises a phototransistor (40) which produces an electrical signal having a strength which is related to an input radiation flux. A transponder receives commands and power from a base station (80) and transmits information quantifying the radiation observed by that digital film grain. An image accumulator (84) connected to the base station (80) assembles an image from the profile of radiation reported by a distribution of digital film grains correlated to the locations of those grains.

20 Claims, 7 Drawing Sheets

U.S. PATENT DOCUMENTS

| | | | |
|---|---|---|---|
| 5,108,881 A | 4/1992 | Dickerson et al. | |
| 5,112,700 A | 5/1992 | Lambert et al. | |
| 5,124,072 A | 6/1992 | Dole et al. | |
| 5,227,253 A | 7/1993 | Takasu et al. | |
| 5,250,366 A | 10/1993 | Nakajima et al. | |
| 5,300,875 A | 4/1994 | Tuttle | |
| 5,336,893 A | 8/1994 | Smith et al. | |
| 5,381,015 A | 1/1995 | Dooms | |
| 5,464,568 A | 11/1995 | Bringley et al. | |
| 5,488,333 A | 1/1996 | Vig | |
| 5,541,604 A | 7/1996 | Meier | |
| 5,545,291 A | 8/1996 | Smith et al. | |
| 5,626,957 A | 5/1997 | Benso et al. | |
| 5,659,170 A * | 8/1997 | Da Silveira et al. | 250/287 |
| 5,871,892 A | 2/1999 | Dickerson et al. | |
| 5,874,724 A | 2/1999 | Cato | |
| 6,075,248 A * | 6/2000 | Jeromin et al. | 250/370.09 |
| 6,099,178 A | 8/2000 | Spurr et al. | |
| 6,274,508 B1 | 8/2001 | Jacobsen et al. | |
| 6,320,189 B1 * | 11/2001 | Ouvrier-Buffet et al. | 250/338.4 |
| 6,381,418 B1 | 4/2002 | Spurr et al. | |
| 6,424,315 B1 | 7/2002 | Glenn et al. | |
| 6,496,382 B1 | 12/2002 | Ferguson et al. | |
| 6,522,799 B1 | 2/2003 | Bazylenko et al. | |
| 6,784,433 B1 * | 8/2004 | Zur | 250/370.09 |
| 6,800,858 B1 * | 10/2004 | Seppi | 250/370.11 |

FOREIGN PATENT DOCUMENTS

| | | |
|---|---|---|
| WO | WO 00/43552 | 7/2000 |

OTHER PUBLICATIONS

R. Johnson and H. Jasik, editors; Antenna Engineering Handbook, Third Edition, 1993.

* cited by examiner

DIGITAL FILM GRAIN

FIELD OF THE INVENTION

This invention relates in general to photodetector arrays for acquiring images and in particular to digital film grains.

BACKGROUND OF THE INVENTION

X-ray imaging can be performed with silver halide film to detect the x-rays directly or to detect electrons dislodged from an atom in the film by absorption of an x-ray. Each silver halide grain is too thin to absorb an appreciable fraction of the incident x-rays, so that silver halide film exhibits much less sensitivity to x-rays than to visible light. Increasing the film's thickness of silver increases its cost and degrades the spatial resolution of the images it can convey. A screen-film combination interposes a phosphor screen to convert each absorbed x-ray into a burst of visible photons, enhancing the response of the silver halide film. These phosphor screens are typically brittle slabs of refractive material, susceptible to breakage if dropped or bent. The mechanical inflexibility of the phosphor screen prevents conforming the screen-film combination to the patient, impairing comfort and image resolution.

X-ray images can also be acquired by an array of electronic detectors, either photodetectors sensitive directly to the x-rays or indirectly to visible light from interposed phosphors, or electron detectors sensitive to the electrons dislodged by x-ray absorption. Electronic detectors are active devices requiring external electrical power to register detection of x-rays by increasing the device's conduction of electrical current or change in voltage between two sensed locations along the electrical path. Some electronic detective arrays are fabricated as periodic structures on crystalline semiconductors. The crystalline semiconductive substrate must extend over an area wider than the largest object intended to be imaged, since only one-to-one imaging is typically performed because imaging lenses are not commercially practical for x-rays now. A crystalline or glass substrate extending more than several centimeters in two dimensions but thinner than a centimeter in its third dimension is expensive, structurally inflexible, and breakable. Each detective site in the array requires a continuous electrically conductive path to the array's image accumulator.

A radio frequency identification (RFID) tag including a photodetector is disclosed in U.S. Pat. No. 5,874,724 (Cato) for enabling a light-flash sequence to control which RFID tag responds to a predefined command from the RFID base station. A pulsed light source aimed toward this (RFID) tag-photodector combination "quickly and efficiently identifies individual items in a large group which is within a range of the base station," according to Column 1, describes attaching a wavelength-selective filter to the photodetector but does not mention attaching material, such as phosphor, to increase the signal received by the photodetector. The claims are limited to a "directional signal" and associated detector, with one possibility being a light beam. U.S. Pat. No. 5,874,724 does not discuss using this combination of photodetector and RFID tag or arrays of this combination for imaging, nor integration of the photodetector with the RFID on a single substrate small enough to satisfy resolution constraints of imaging.

The present invention offers adequate x-ray sensitivity using a mechanically flexible, rugged substrate. The location of independent sensor-transponder combinations can be arranged as a periodic lattice, as a random arrangement, or as a collection of periodicities in order to ensure sampling of requisite spatial frequencies of the x-ray image in specific areas. The present invention does not require electrical connections spanning the distance between independent sensor-transponder combinations, allowing broader choices of the material occupying those spaces and greater latitude in their fabrication.

SUMMARY OF THE INVENTION

Briefly, according to one aspect of the present invention, a digital film grain comprises a photodetector that produces an electrical signal having a strength related to an input light flux and a transponder that receives the electrical signal and transmits information quantifying the electrical signal.

In one embodiment, a miniature signal sensor with a radio frequency transponder is placed in a capillary or well, along with material enhancing the signal, such as x-ray phosphor. Material between the capillaries or forming the walls of the capillaries reduces or prevents the signal generated in each capillary from generating a response in any other capillary. The walls of the capillaries can be reflective for the visible light or for electrons emitted by the phosphor upon absorbing an x-ray in order to reduce loss of signal.

The sensor may be a photodetector or electron detector fabricated with a radio frequency transponder and antenna on a silicon chip. Alternatively, it may be an organic thin-film transistor. The array of capillaries or wells may be fabricated by a variety of methods, including pressing, adhering, or melting individual capillaries together; photolithographically etching glass or silicon or polymeric film; exposing polymeric film such as polycarbonate at the location of desired holes with a beam of x-rays or high-energy electrons of smaller diameter than the desired hole, followed by preferential etching of those beam tracks by a strongly alkaline solution; by laser drilling; or by stamping or embossing a polymeric film, and by other techniques known in the art.

A single combination of sensor and transponder, i.e., a digital film grain, may be placed in each capillary with a pick-and-place apparatus, or each well may be made only deep enough to hold only a single digital film grain so that the digital film grains can be swept into the wells. Distributing digital film grains into the limited-size wells may be an intermediate fabrication step, followed by transferring the digital film grains into deeper wells with material enhancing the signal. Resolution finer than the lateral dimension of the digital film grain can be attained by interleaving layers of digital film grains.

A flexible substrate may be used for some applications; for example, conforming to a patient for comfort and for improved imaging resolution. The spatial density of sensors may be uniform in order to avoid clumping of response in parts of the image and to maintain predetermined sensitivity to a range of spatial frequencies. The spatial resolution can be improved by preventing spreading of the response to stimulus at one location beyond the diameter of the capillary to other sensors.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with, the apparatus in accordance with the present invention. It is to be understood that elements not specifically shown or described may take various forms well known to those skilled in the art.

Figure 1:
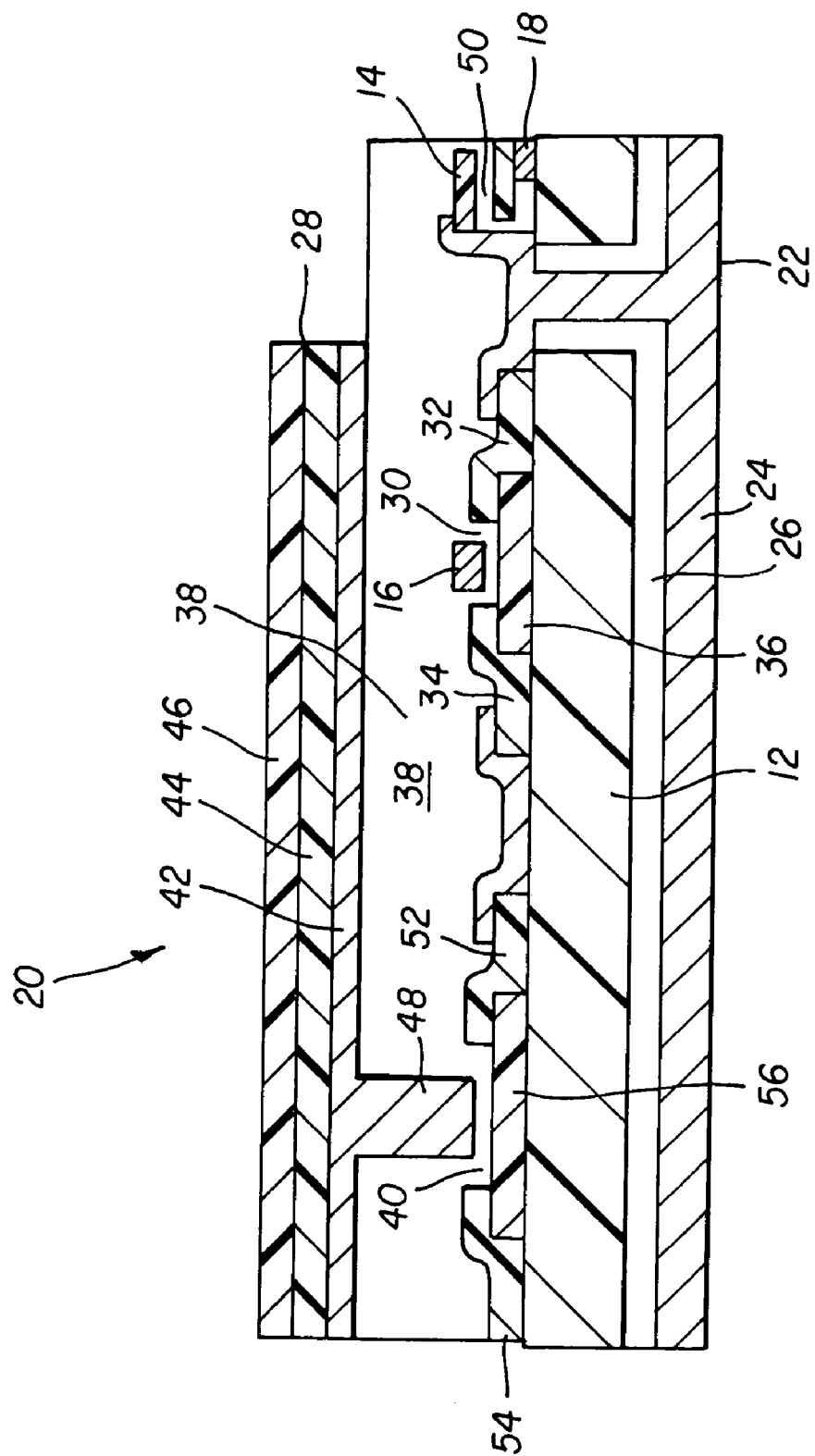
FIG. 1 shows a sectional view of a combination of a photodetector and an antenna coated on opposite sides of a crystalline silicon substrate, a digital film grain according to the present invention.
Figure 2:
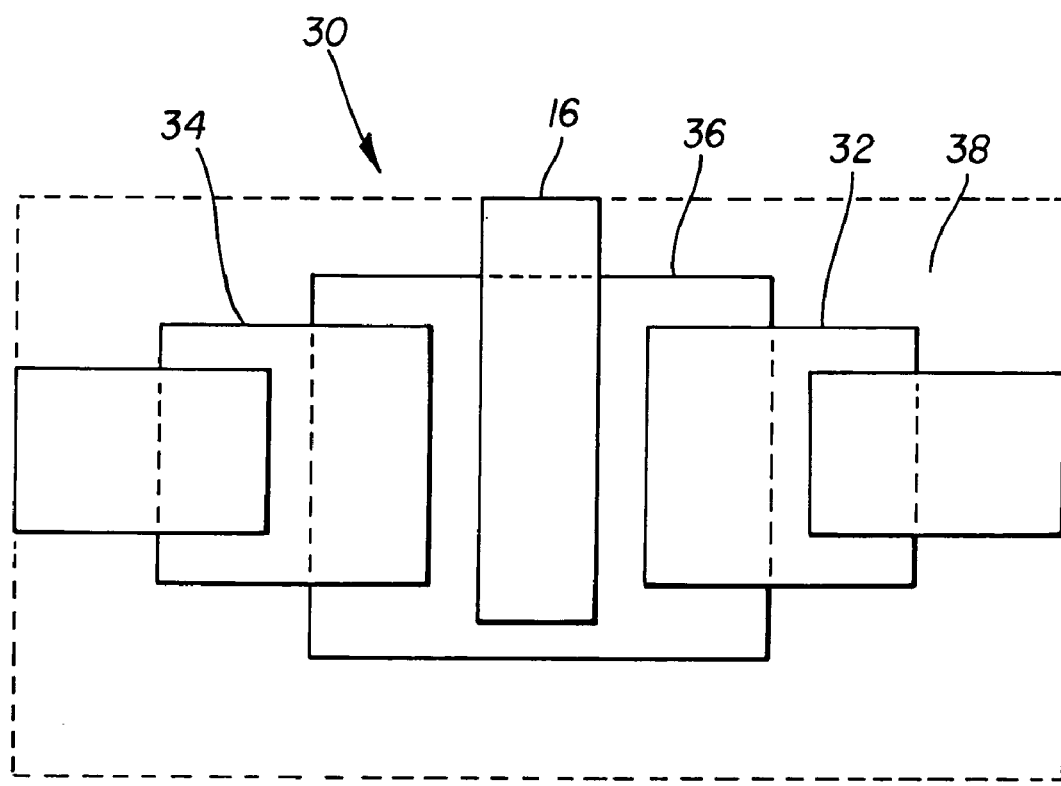
FIG. 2 is a schematic layout of a single field-effect transistor fabricated on crystalline silicon.

Referring now to FIG. 1, a p-type layer 36 is deposited on the surface of the crystalline silicon substrate 12 to constitute the central semiconductor of a field-effect transistor 30. Two patches of n-type layer of amorphous silicon are deposited on the surface of the crystalline silicon substrate 12 overlapping p-type layer 36 and fashioned into source 32 and drain 34 of a field-effect transistor 30 shown in FIG. 2. An insulating layer 38 coats p-type layer 36 and at least part of source 32 and drain 34. A gate electrode 16 is fashioned of metal over the p-type layer 36, but separated from electrical contact with that p-type layer 36 by insulator 38, to complete fabrication of the field-effect transistor 30.

The insulator layer 38, preferably composed of silicon oxide or possibly another oxide or silicon nitride or polymer, covers most of the field-effect transistors 30. A layer of conductive metal 42 is deposited on most of the insulator layer 38 as well as filling a via 48 formed through a partial thickness of the insulator layer 38 over the area of the central semiconductor 56 between source 52 and drain 54 of one of the transistors to initiate fabrication of a phototransistor 40. A layer of n-type amorphous silicon 44 overlain with a layer of p-type amorphous silicon 46 covers the conductive metal layer to establish a photosensitive p-n junction 28 over a significant portion of the surface of the digital film grain, completing fabrication of the phototransistor 40. Other types of integrated-circuit devices can serve as the photodetector, such as a photodiode or a CMOS capacitor or a CCD capacitor fabricated with the appropriate architecture. Integrated on crystalline silicon substrate 12 along with the phototransistor 40 are many field-effect transistors 30 electrically connected to constitute the devices in FIG. 3 performing the functions of:

a photocurrent integrator 62 to accumulate the detected signal;

an analog-to-digital converter 64 to create a version of that signal suitable for modulating a radiowave in order to convey the detected image pixel to the image accumulator 84;

a data memory 74 to retain that digital signal until the digital film grain 20 is commanded to transmit the signal value;

an identification-number memory 72 to ensure that the correct digital film grain receives messages intended for it and to identify its digital signal to the image accumulator 84;

controlling electronics 66 to switch the radio frequency modulator and demodulator 68 between receiving and transmitting modes at the correct times; to route the digital data and the identification number between the phototransistor 40, the memories 72 and 74, and the radio frequency modulator 68 at the proper times; and to switch connection with the antenna 22 between information-transponding and energy-recharging modes; and an energy storage device 50 to retain energy inductively coupled from the base station's 80 power-transfer antenna 82 as described in U.S. Pat. No. 4,730,188 (Milheiser); U.S. Pat. No. 5,053,774 (Schuermann et al.); U.S. Pat. No. 5,541,604 (Meier); and other prior art in order to provide electrical power for the field-effect transistors 30 and phototransistor 40 to perform their functions.

Other electrical circuits known in the art can be used instead of the electrical current integrator for digital quantification of the light flux observed by the photodetector, such as by analog-to-digital conversion of the photodetector's voltage or current, or by photon-counting the electrical current pulses produced by the photodetector.

The energy storage device 50 can be fabricated as a capacitor with one conductive plate composed a section of p-type amorphous silicon layer 18, overlain with an insulating layer 38, overlain with the other conductive plate of the capacitor composed of a layer 14 of n-type amorphous silicon, all insulated from the conductive metallic layer 42 connected to the photosensitive layer of the phototransistor 40.

The base station 80 may devote antenna 82 solely to power transfer and have a second antenna for radio frequency communications with the digital film grains 20. The power-transfer antenna 82 would supply energy to the digital film grains 20 whenever the film grains are required to be active, allowing the digital film grains 20 to be fabricated without energy storage devices 50 and alleviating some of the communication overhead of synchronizing the digital film grains 20 or switching them to their active state by commands sent from the base station 80. A subset of the digital film grains 20 could be addressed by placing a power-transfer antenna 82 or a plurality of antennas close to that group of digital film grains 20 without interfering signals from other digital film grains beyond the power transfer range of an energized power-transfer antenna 82.

A photodetective digital film grain 20 might alternatively be made similarly to the digital film grain just described, but replacing all of the n-type amorphous silicon with p-type amorphous silicon and replacing all of the p-type amorphous silicon with n-type amorphous silicon.

Instead of amorphous silicon on a crystalline substrate, the digital film grain might be fabricated as thin-film transistors of polysilicon on a glass or silicon substrate, as amorphous silicon transistors on polymeric or glass substrate, or as transistors of organic semiconductors on polymeric substrate.

Deletion of the p-type layer 46 of the phototransistor 40 schematized in FIG. 1 facilitates an electron liberated by absorption of an x-ray to be accepted by the digital film grain 20 and to migrate through the via 48 near to the central semiconductor 56 where the current flow between source 52 and drain 54 can be influenced, conferring the ability to directly detect electrons.

A metallic layer 24 coated on the opposite surface of the crystalline silicon substrate 12 in FIG. 1, possibly with an intervening insulating layer 26, constitutes an antenna 22 for sending and receiving radio frequency energy. That energy may possibly be encoded with signal or with identification information during some transmissions. As described in U.S. Pat. No. 6,424,315 (Glenn et al.), this metallic layer 24 can be etched to create a tuned antenna and electrically connected to the radio frequency output stage of the integrated circuit fabricated on substrate 12. The assemblage of phototransistor 40, devices constituted by field-effect transistors 30, substrate 12, and antenna 22 constitute a digital film grain 20 sensitive to visible light.

Figure 3:
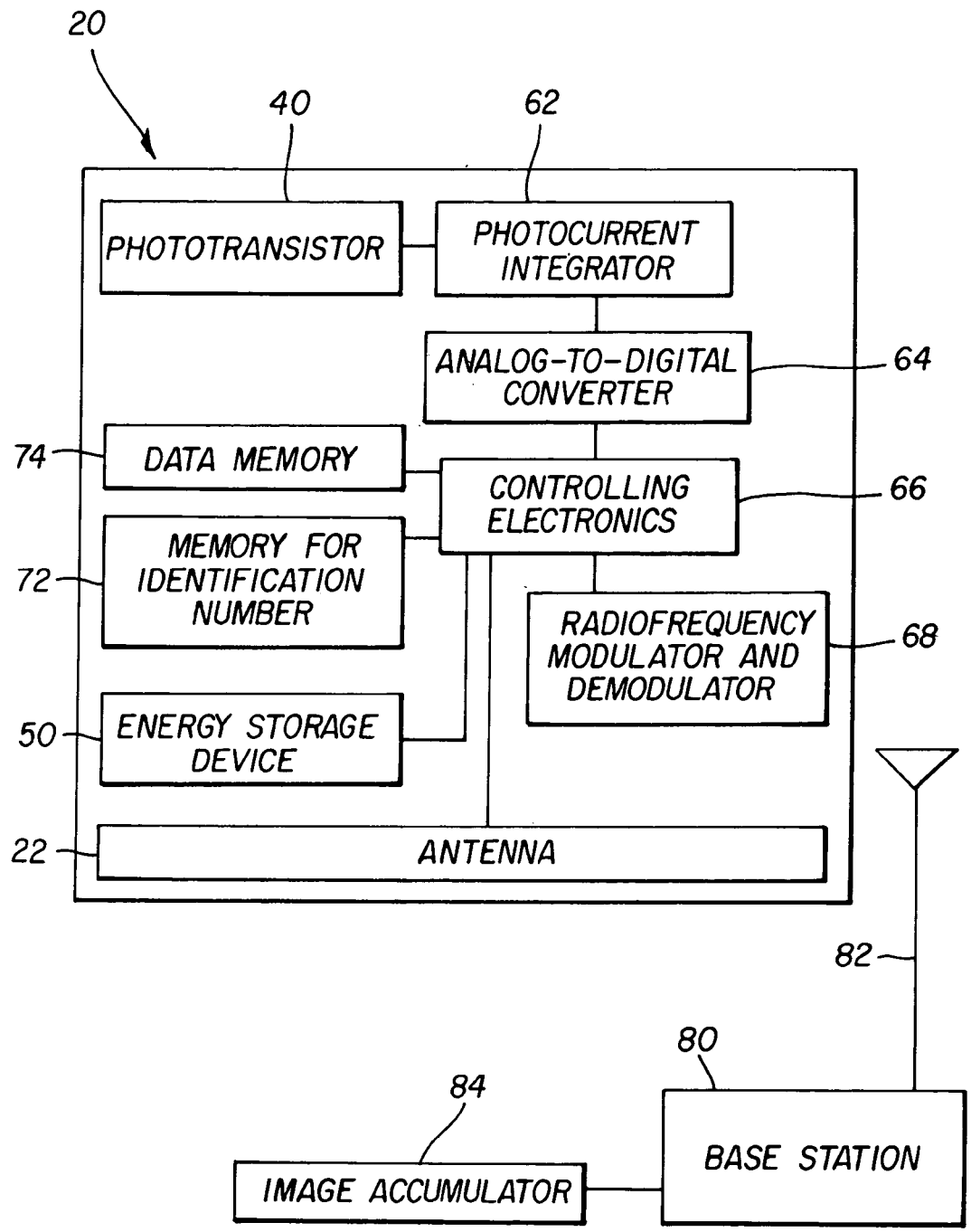
FIG. 3 is a block diagram of a digital film grain and base station.

The radio frequency modulator and demodulator 68, and antenna 22, and the connection among them moderated by the control electronics 66 in FIG. 3 constitute the transponder enabling each digital film grain 20 to communicate with a base station 80 through the base station's antenna 82. The base station 80 directs the identity of the digital film grain 20 and its corresponding signal value to the image accumulator 84 that collates the signals from the entire array according to the relative location determined for each digital film grain 20. The image accumulator 84 may be a subsystem in the base station 80 or may be external, but connected for information transfer, to the base station 80. Because this radio frequency link between the digital film grains 20 and image accumulator 84 does not require any electrical conductors spanning the entire distance from the digital film grains 20 to the image accumulator 84, the choice of locations of individual digital film grains 20 and the material characteristics of any intervening material is unfettered by requirements of electrical conductivity.

Figure 4:
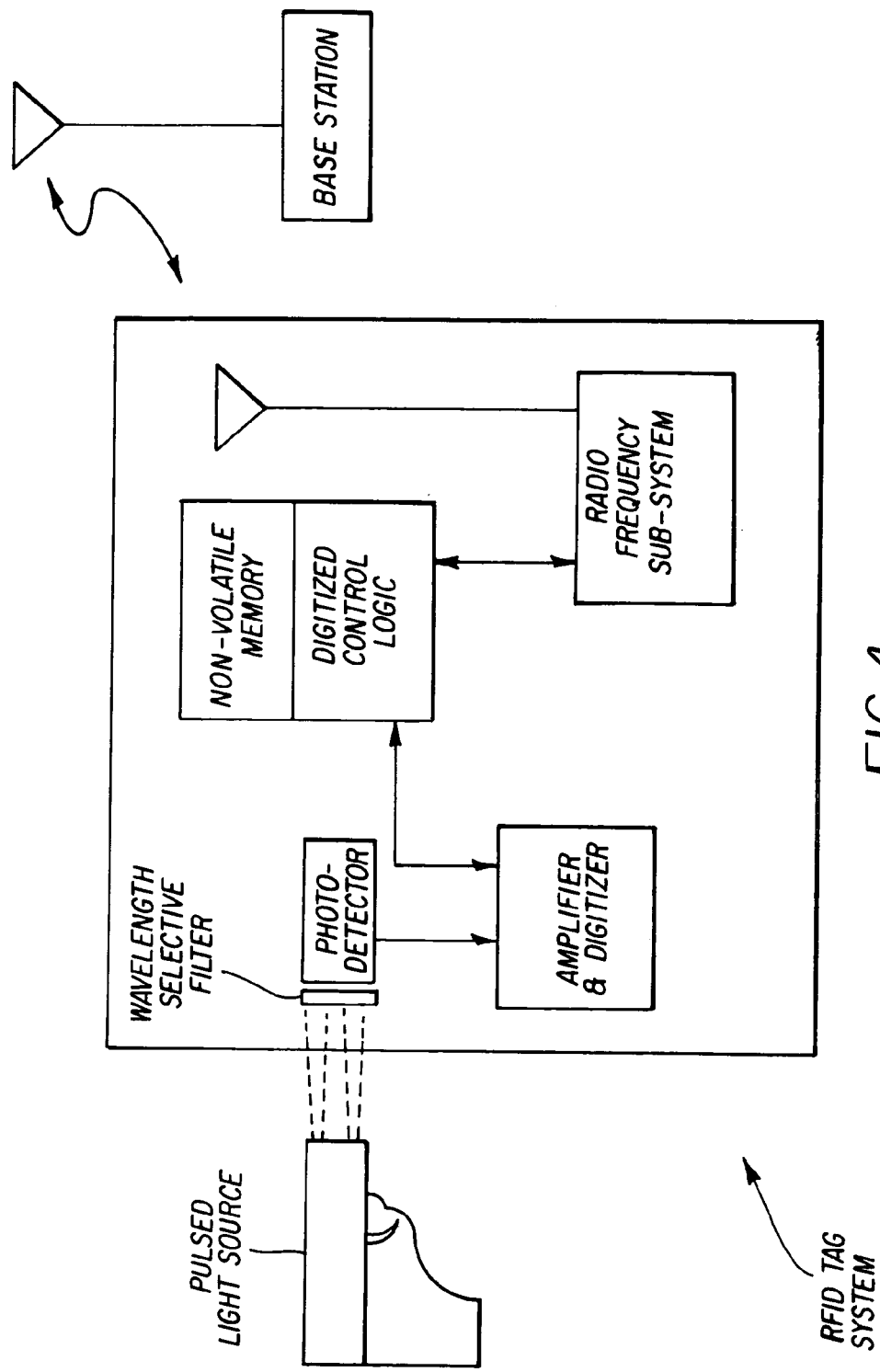
FIG. 4 is a block diagram of a prior art photodetector and radio frequency sub-system.

The present invention differs from the prior art, published in U.S. Pat. No. 5,874,724 and reproduced here as FIG. 4, by fabricating the digital film grain with size commensurate with the requirements of the image to be accumulated. The present invention differs in a second way from this prior art in FIG. 4 by distributing a set of digital film grains 20 spatially in a manner suitable for sampling an adequate section of the irradiance profile with sufficient resolution to assemble a discernable image. The present invention differs in a third way from this prior art by assembling an image from the values reported by a set of digital film grains 20 using knowledge of each grain's location to place that grain's reported value in relation to other grains' reported values. The pulsed light source of the prior art in FIG. 4 is not required by the present invention to accomplish its purpose of acquiring an image.

Figure 5:
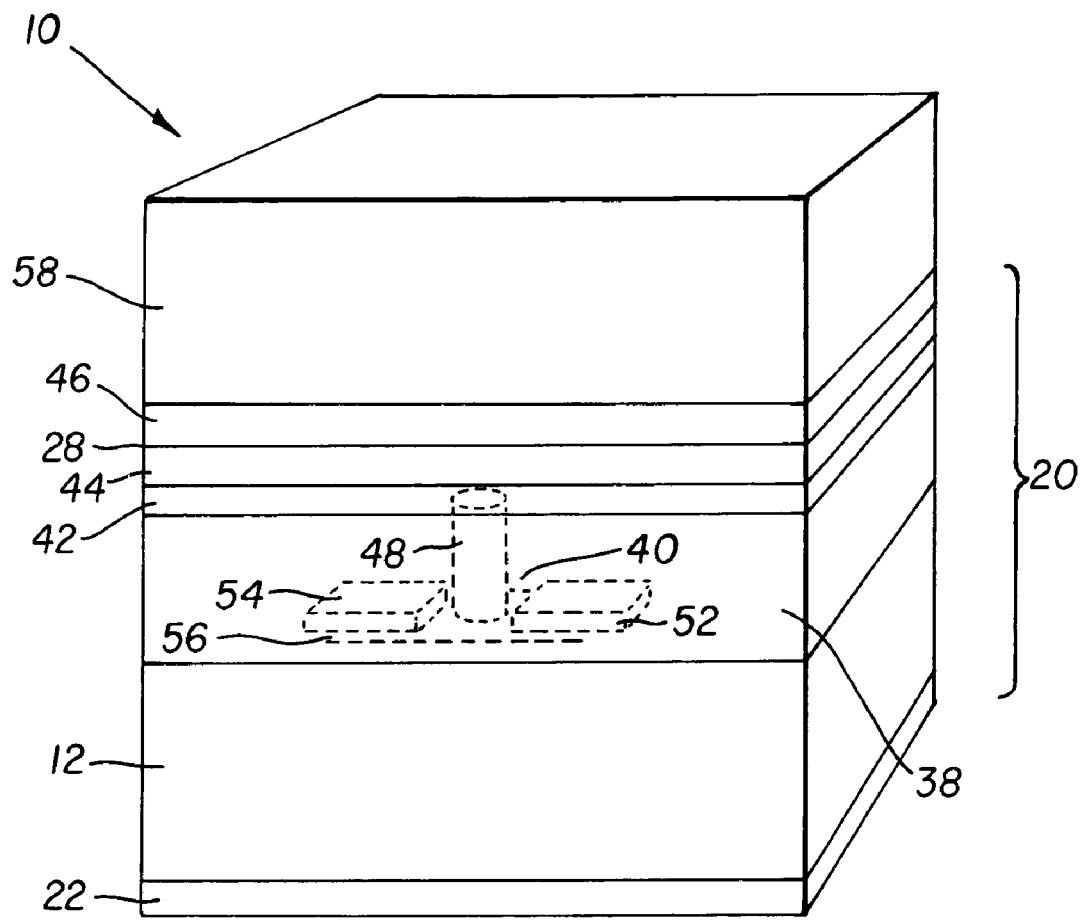
FIG. 5 is a perspective view, partially in phantom, showing a layer of phosphor adhering directly to the photoresponsive surface of the phototransistor, rendering the digital film grain sensitive to x-rays.

Coating the p-type layer 46 of digital film grain 20 with an x-ray phosphor or luminophor layer 58 produces a digital x-ray film grain 10 in FIG. 5 operating as an indirect detector of x-rays. Phosphors are materials that emit infrared, visible, or ultraviolet radiation upon excitation. An intrinsic phosphor is a material that is naturally (that is, intrinsically) phosphorescent. An "activated" phosphor is one composed of a basic material that may or may not be an intrinsic phosphor, to which one or more dopant(s) has been intentionally added. These dopants "activate" the phosphor and cause it to emit infrared, visible, or ultraviolet radiation. For example, in $Gd_2O_2S$:Tb, the Tb atoms (the dopant/activator) give rise to the optical emission of the phosphor. Some phosphors, such as BaFBr, are known as storage phosphors. In these materials, the dopants are involved in the storage as well as the emission of radiation.

Any conventional or useful phosphor can be used, singly or in mixtures, in the practice of this invention. More specific details of useful phosphors are provided as follows.

For example, useful phosphors are described in numerous references relating to fluorescent intensifying screens, including but not limited to, Research Disclosure, Vol. 184, August 1979, Item 18431, Section IX, X-ray Screens/Phosphors; and U.S. Pat. No. 2,303,942 (Wynd et al.); U.S. Pat. No. 3,778,615 and U.S. Pat. No. 4,032,471 (both to Luckey); U.S. Pat. No. 4,225,653 (Brixner et al.); U.S. Pat. No. 3,418,246 (Royce); U.S. Pat. No. 3,428,247 (Yocon); U.S. Pat. No. 3,725,704 (Buchanan et al.); U.S. Pat. No. 2,725,704 (Swindells); U.S. Pat. No. 3,974,389 (Ferri et al.); U.S. Pat. No. 3,617,743, U.S. Pat. No. 3,591,516, U.S. Pat. No. 3,607,770, U.S. Pat. No. 3,666,676, and U.S. Pat. No. 3,795,814 (all to Rabatin); U.S. Pat. No. 4,405,691 (Yale); U.S. Pat. No. 4,311,487 (Luckey et al.); U.S. Pat. No. 4,387,141 (Patten); U.S. Pat. No. 5,021,327 (Bunch et al.); U.S. Pat. No. 4,865,944 (Roberts et al.); U.S. Pat. No. 4,994,355, U.S. Pat. No. 4,997,750, U.S. Pat. No. 5,108,881, and U.S. Pat. No. 5,871,892 (all to Dickerson et al.); U.S. Pat. No. 5,064,729 (Zegarski); U.S. Pat. No. 5,250,366 (Nakajima et al.); and EP-A-0 491,116 (Benzo et al.), the disclosures of all of which are incorporated herein by reference with respect to the phosphors.

Useful classes of phosphors include, but are not limited to, calcium tungstate ($CaWO_4$), activated or unactivated lithium stannates, niobium and/or rare earth activated or unactivated yttrium, lutetium, or gadolinium tantalates, rare earth (such as terbium, lanthanum, gadolinium, cerium, and lutetium)-activated or unactivated middle chalcogen phosphors such as rare earth oxychalcogenides and oxyhalides, and terbium-activated or unactivated lanthanum and lutetium middle chalcogen phosphors.

Still other useful phosphors are those containing hafnium as described for example in U.S. Pat. No. 4,988,880, U.S. Pat. No. 4,988,881, U.S. Pat. No. 4,994,205, and U.S. Pat. No. 5,095,218 (all to Bryan et al.); U.S. Pat. No. 5,112,700 (Lambert et al.); U.S. Pat. No. 5,124,072 (Dole et al.); and U.S. Pat. No. 5,336,893 (Smith et al.), the disclosures of which are all incorporated herein by reference.

Preferred rare earth oxychalcogenide and oxyhalide phosphors are represented by the following formula (1):

$$M'_{(w-r)}M''_rO_wX' \tag{1}$$

wherein M' is at least one of the metals yttrium (Y), lanthanum (La), gadolinium (Gd), or lutetium (Lu), M" is at least one of the rare earth metals, preferably dysprosium (Dy), erbium (Er), europium (Eu), holmium (Ho), neodymium (Nd), praseodymium (Pr), samarium (Sm), tantalum (Ta), terbium (Tb), thulium (Tm), or ytterbium (Yb), X' is a middle chalcogen (S, Se, or Te) or halogen, r is 0.002 to 0.2, and w is 1 when X' is halogen or 2 when X' is a middle chalcogen. These include rare earth-activated lanthanum oxybromides, and terbium-activated or thulium-activated gadolinium oxides such as $Gd_2O_2S$:Tb.

Other suitable phosphors are described in U.S. Pat. No. 4,835,397 (Arakawa et al.) and U.S. Pat. No. 5,381,015 (Dooms), both incorporated herein by reference, and including for example divalent europium and other rare earth activated alkaline earth metal halide phosphors and rare earth element activated rare earth oxyhalide phosphors. Of these types of phosphors, the more preferred phosphors include alkaline earth metal fluorohalide prompt emitting and/or storage phosphors [particularly those containing iodide such as alkaline earth metal fluoro-bromo-iodide storage phosphors as described in U.S. Pat. No. 5,464,568 (Bringley et al.)], incorporated herein by reference.

Another class of phosphors includes compounds having a rare earth host and are rare earth activated mixed alkaline earth metal sulfates such as europium-activated barium strontium sulfate.

Particularly useful phosphors are those containing doped or undoped tantalum such as $YTaO_4$, $YTaO_4$:Nb, $Y(Sr)TaO_4$, and $Y(Sr)TaO_4$:Nb. These phosphors are described in U.S. Pat. No. 4,226,653 (Brixner); U.S. Pat. No. 5,064,729 (Zegarski); U.S. Pat. No. 5,250,366 (Nakajima et al.); and U.S. Pat. No. 5,626,957 (Benso et al.), all incorporated herein by reference.

Other useful phosphors are alkaline earth metal phosphors that can be the products of firing starting materials comprising optional oxide and a combination of species characterized by the following formula (2):

$$MFX_{(1-z)}I_zuM^aX^a:yA:eQ:tD \qquad (2)$$

wherein M is magnesium (Mg), calcium (Ca), strontium (Sr), or barium (Ba), F is fluoride, X is chloride (Cl) or bromide (Br), I is iodide, $M^a$ is sodium (Na), potassium (K), rubidium (Rb), or cesium (Cs), $X^a$ is fluoride (F), chloride (Cl), bromide (Br), or iodide (I), A is europium (Eu), cerium (Ce), samarium (Sm), or terbium (Tb), Q is BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, or $ThO_2$, D is vanadium (V), chromium (Cr), manganese (Mn), iron (Fe), cobalt (Co), or nickel (Ni). The numbers in the noted formula are the following: "z" is 0 to 1, "u" is from 0 to 1, "y" is from $1 \times 10^{-4}$ to 0.1, "e" is from 0 to 1, and "t" is from 0 to 0.01. These definitions apply wherever they are found in this application unless specifically stated to the contrary. It is also contemplated that M, X, A, and D represent multiple elements in the groups identified above.

Storage phosphors can also be used in the practice of this invention. Various storage phosphors are described for example, in U.S. Pat. No. 5,464,568 (noted above), incorporated herein by reference. Such phosphors include divalent alkaline earth metal fluorohalide phosphors that may contain iodide are the product of firing an intermediate, comprising oxide and a combination of species characterized by the following formula (3):

$$[Ba_{(1-a-b-c)}Mg_aCa_bSr_c]FX_{(1-z)}I_zrM^aX^a:yA \qquad (3)$$

wherein X, $M^a$, $X^a$, A, z, and y have the same meanings as for formula (2) and the sum of a, b, and c is from 0 to 4, and r is from $10^{-6}$ to 0.1. Some embodiments of these phosphors are described in more detail in U.S. Pat. No. 5,464,568 (noted above). A particularly useful storage phosphor is BaFBr:Eu.

Still other storage phosphors are described in U.S. Pat. No. 4,368,390 (Takahashi et al.), incorporated herein by reference, and include divalent europium and other rare earth activated alkaline earth metal halides and rare earth element activated rare earth oxyhalides, as described in more detail above.

Examples of useful phosphors include: SrS:Ce, SM; SrS: Eu, Sm; $ThO_2$:Er; $La_2O_2S$:Eu, Sm; ZnS:Cu, Pb; and others described in U.S. Pat. No. 5,227,253 (Takasu et al.), incorporated herein by reference.

Many of these digital x-ray film grains 10 can be disposed on or in a matrix 92, such as a glass or a polymer, to produce an x-ray imaging recorder 90. The digital x-ray film grains 10 can be randomly located or placed at intended locations with random orientation or with their phosphor layer 58 oriented at a specific direction with respect to matrix 92, permitting optimization of imaging performance in consideration of fabrication expense. An encapsulating layer with refractive index higher than that of the matrix can coat the x-ray phosphor layer 58 to increase the internal reflection of the light emitted by the x-ray phosphor layer 58, which increases the signal detected by that digital x-ray film grain 10. Alternatively, the phosphor layer can have an index of refraction higher than that of the matrix, internally reflecting a greater portion of the light emitted by the x-ray phosphor layer 58 than a low-index material would and increasing the signal detected by that digital x-ray film grain 10. The matrix can be absorptive of the visible light emitted by the x-ray phosphor layer 58 in order to prevent light emitted by the phosphor 58 coated on one digital x-ray film grain 10 from producing a response in a neighboring digital x-ray film grain, which would degrade the spatial resolution of the image. The matrix can be flexible since no conductive materials are needed to interconnect digital x-ray film grains. This mechanical flexibility permits this x-ray imaging recorder 90 to conform to the patient, affording more comfort for the patient while providing better spatial resolution by virtue of the improved proximity to the patient's organs and bones. Mechanical flexibility enables the x-ray imaging recorder 90 to absorb mechanical shock without breaking while dissipating the shock distributed among the digital x-ray film grains 10, rendering the x-ray imaging recorder 90 more robust for handling than either screen-film combinations or electrical detectors with dimensions exceeding a centimeter in at least one dimension but less than a centimeter in at least one of the remaining two dimensions.

Replacement of both the n-type layer 44 and the p-type layer 46 of the phototransistor schematized in FIG. 1 with a direct detector converting x-rays into electrons, such as cadmium telluride, cadmium zinc telluride, lead iodide, mercuric iodide, or amorphous selenium, produces an digital x-ray film grain 10 without the need for a phosphor or luminophor coating 58.

The sides of the antenna 22 are constrained to be smaller than the substrate 12, i.e., typically smaller than 100 μm to provide adequate spatial resolution of the image. If the radio frequency communication uses 2.4 GHz with associated 125 mm wavelength, this antenna 22 size is only one-thousandth of the radiated wavelength. Since the antenna is too small to be resonant with the wavelength, its efficiency of emitting that wavelength is proportional to the ratio of the antenna's area A with the square of the radio frequency wavelength A according to the equation for antenna gain G on pages 2–39 of Henry Jasik in *Antenna Engineering Handbook, Third Edition*, 1993:

$$G = 4\pi \frac{A}{\lambda^2}$$

Figure 6:
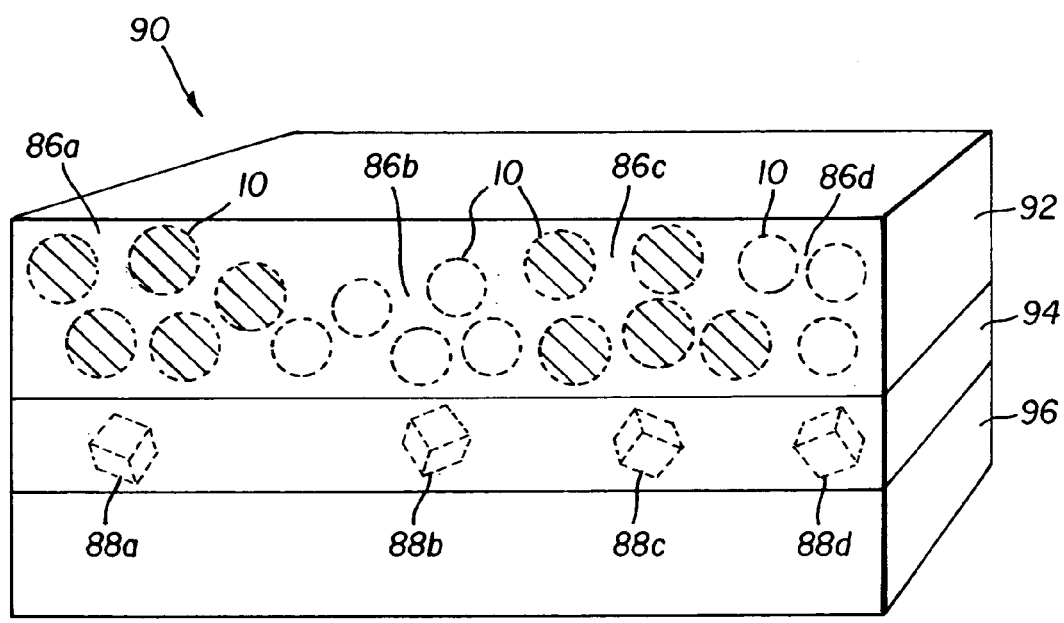
FIG. 6 is a perspective view of a random array of digital film grains suspended in a transmissive matrix x-ray.

This small antenna 22 would emit only one-millionth of the radio frequency power if driven with the same electrical current as a resonant antenna. This inefficiency implies that antenna 22 exhibits a very short range for both receiving and transmitting the radio frequency signal. Each of the signal repeaters 88a–d in FIG. 6 provides a way to shorten the range required for each digital film grain 20 or digital x-ray film grain 10. A signal repeater contains the devices necessary for radio frequency communication and signal storage and identification but does not contain a photosensor or electron detector so that each signal repeater 88a–d is insensitive to the x-ray flux. The signal repeater can be much larger than a digital film grain 20 or digital x-ray film grain 10 since the signal repeater 88 does not affect the imaging pixel's size. A layer 94 of signal repeaters 88a–d may be coated near the layer 92 containing the digital film grains 20 or digital x-ray film grains 10, possibly on a support 96. The signal repeaters 88a–d use their larger antennas to boost and relay the radio frequency signals between the smaller antennas 22 of the digital film grains 20 or digital x-ray film grains 10 and the distant antenna 82 of the base station 80. In addition, the layer 94 of signal repeaters 88a–d can reduce the time to collect the signals from all of the digital film grains 20 or digital x-ray film grains 10 by arranging for signal repeater 88a to gather the pairs of signals and identities from the digital film grains or digital x-ray film grains 86a in its neighborhood while signal repeaters 88b–d gather signal-identity pairs from the groups 86b–d of grains 10 or 20 in their respective neighborhoods. The signal repeaters 88a–d can reset each of the grains in their respective groups 86a–d to be ready to detect the irradiance profile of another image, and then the signal repeaters 88a–d can relay their locally accumulated signal-identity pairs to the base station 80. Since there are considerably fewer signal repeaters 88a–d than individual grains 10 or 20 in a digital imaging recorder 90, relaying the signal from the signal repeaters 88a–d may reduce the temporal overhead of establishing and verifying the communication channel between the base station 80 and each grain 10 or 20 one at a time.

Several photodetective sites individually measuring different nearby parts of the irradiance profile can be fabricated on the same film grain, constituting a "micro-array" that shares the radio frequency modulator and demodulator 68, antenna 22, and some of the supporting circuitry 30. The photodetective sites of the micro-array can be coated with phosphor or luminophor to confer sensitivity to x-rays. Since this micro-array can have larger lateral dimensions than a digital film grain 10 or 20 with a single photodetector while maintaining a size commensurate with the spatial resolution of the consequent image, the micro-array's antenna 22 can have larger lateral dimensions improving the efficiency of radio frequency transmission for both communication and energy transfer between base station 80 and micro-array, while more circuit elements 30 can be incorporated in the supporting circuits shared by the micro-array's detective elements. The micro-array would preferentially be oriented with its spacing between centers of detective elements perpendicular to the irradiance profile intended to be observed.

Figure 7:
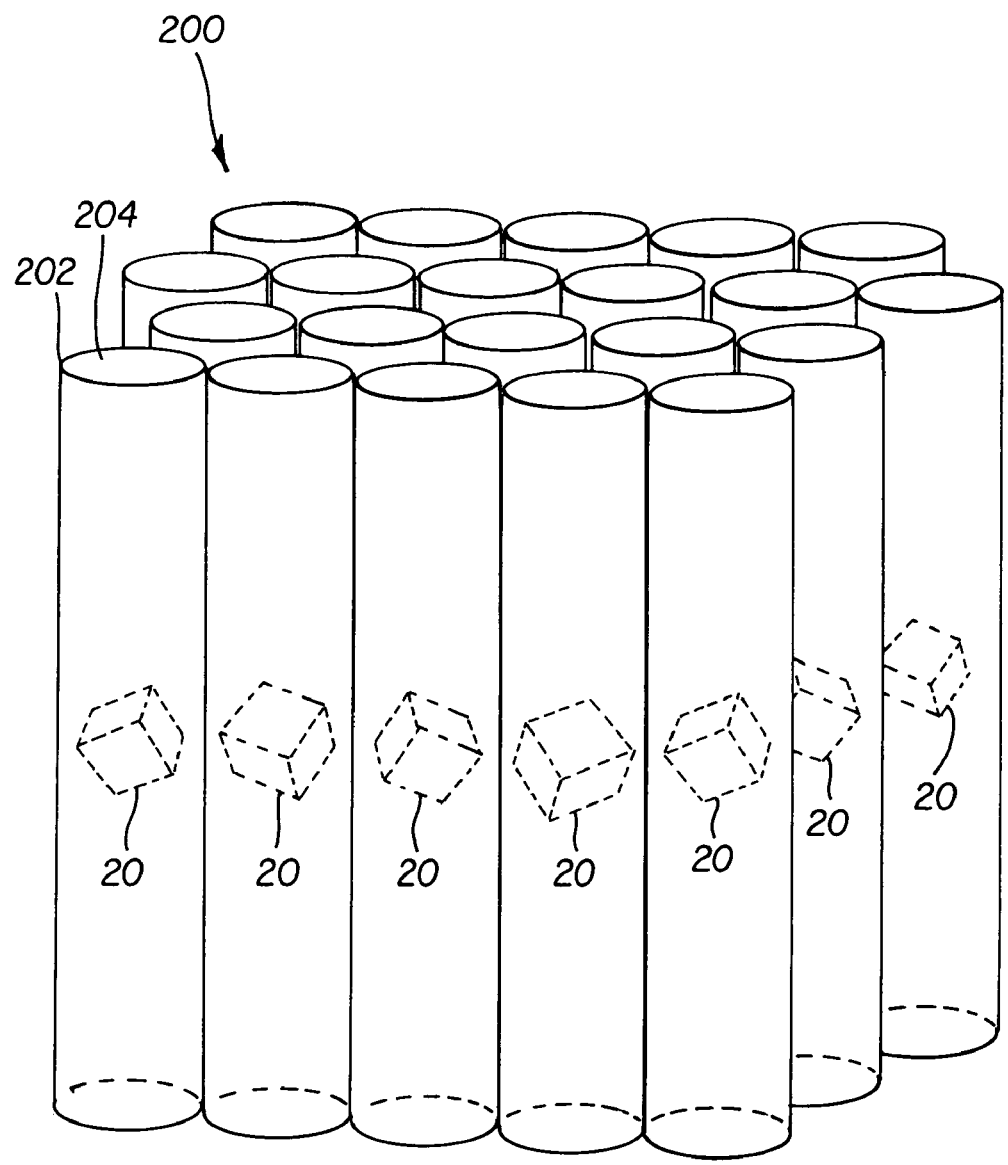
FIG. 7 is a perspective view, partially in phantom, showing an array of digital film grains in capillaries.

Chipping of the x-ray phosphor layer 58 during handling may restrict thickness of the x-ray phosphor layer 58 to the lateral dimensions of the crystalline silicon substrate 12. If greater sensitivity to x-rays is desired for each detective site than that afforded by the x-ray phosphor layer 58, each digital film grain 20 can be immersed in x-ray phosphor 204 inside a capillary or well 202 and these capillaries gathered together in a digital imaging array 200 as in FIG. 7. The distance of interaction between the x-ray flux and the x-ray phosphor 204 in the capillary 202 can be made much longer than the dimensions of the digital film grain's substrate 12, increasing the signal strength received by the phototransistor 40 of the digital film grain 20. The inner surface of the capillary walls 202 can be made reflective for the radiation emitted by the x-ray phosphor 204, further increasing the signal received by the phototransistor 40. The capillary walls 202 or the intervening material between capillaries can be made of absorbers of radiation emitted by the phosphor, reducing the lateral spread of signal recorded by digital film grains 20, thereby improving the spatial resolution of the digital imaging array 200.

The digital film grains 20 or digital x-ray film grains 10 can be placed in wells or capillaries 202 by use of tools called "pick-and-place" apparatus or randomly. The dimensions of the wells can be tailored so flowing many digital film grains 10 or 20 in a fluid across the surface of the wells 202 causes only one digital film grain 10 or 20 in a desired orientation to be located in each well 202 according to U.S. Pat. No. 5,545,291 (Smith et al.). Distributing grains 10 or 20 into the limited-size wells 202 may be an intermediate fabrication step, followed by transferring the grains 10 or 20 into wells 202 of another shape or dimension, possibly adding material 204 enhancing the signal. Superimposing or interleaving layers of grain distributions 90 or arrays 200 can provide imaging resolution finer than the lateral dimension of each grain 10 or 20.

The array 200 of capillaries 202 may be fabricated by: pressing, adhering, or melting individual capillaries 202 together, then plugging one end if wells are desired. Wells or capillaries 202 can be formed by exposing polymeric film (not shown) such as polycarbonate at locations of desired holes with a beam of x-rays or high-energy electrons of smaller diameter than the desired hole, followed by preferential etching of those beam tracks by a strongly alkaline solution. The wells 202 can be made by embossing or stamping or rolling a template across a substrate, photolithographically masking and etching a substrate, transferring to the substrate from an adhesive tape, softening the substrate by heat, or laser drilling as enumerated in U.S. Pat. No. 6,274,508 (Jacobsen et al.).

Correlating the identity of a digital film grain 20 or digital x-ray film grain 10 with its location in the imaging recorder 90 or imaging array 200 must be done at least once before an interpretable image can be reconstructed, and can be performed either before or after accumulation of x-ray flux pattern from a sample or patient. If each grain 10 or 20 of known identification number is placed at a known location during fabrication of the digital imaging recorder 90 or array 200, then the correlation is produced directly as a result of fabrication. If the grains 10 or 20 are located at random positions or if the identity of each grain 10 or 20 is not retained during placement at a known location, then a test pattern, a series of test patterns, or a scanning beam must be observed by the digital imaging recorder 90 or array 200, enabling inference of the location of each grain correlated to that grain's identification number. A table of this correlation of position and identification number of each grain 10 or 20 can be retained and applied to all of that digital imaging recorder's signal-identity pairs. Alternatively, a new identification number can be transmitted to each grain for storage in that grain's identification-number memory 72, permitting faster or less expensive decoding of the image and reducing the amount of requisite circuitry, possibly by supplanting the location-identification number table with an algorithm such as reading grains 10 or 20 in the order of their identification numbers.

Radio frequency transmissions between base station 80 and digital film grains 20 or digital x-ray film grains 10 for acquiring an image could occur according to the sequence:

The base station 80 sends a coded pulse instructing all grains 10 or 20 in the x-ray image recorder 90 or digital imaging array 200 to switch to power-reception mode. Any grain whose energy storage device 50 has discharged below the level necessary to receive or transmit any information is automatically set in power-reception mode.

The base station 80 sends a power pulse recharging the energy storage device 50 in every grain 10 or 20. The controlling electronics 66 in each grain automatically switches to information-reception mode after directing this power pulse to its energy storage device 50.

The base station 80 sends an information code instructing all of the grains 10 or 20 to begin using their photocurrent integrators 62 to accumulate signal from their phototransistors 40 at a specified time.

The sample is exposed with light or x-rays, producing a signal in each grain 10 or 20 depending upon that grain's position in the irradiance pattern.

The base station 80 sends an information code instructing all grains 10 or 20 to complete their integrations by converting their signals into digital values and inserting those digital values into the data memories 74.

The base station 80 interrogates each grain 10 or 20 by sending an identification number and instructing only the grain with that number in its identification-number memory 72 to respond by transmitting the value in its data memory 74, possibly accompanied by the grain's identification number to resolve conflicts in case more than one grain 10 or 20 transmits a response.

The base station 80 sends the set of signal-identification number pairs to the image accumulator 84 to produce a human-interpretable image by application of the location-identification number table or algorithm.

The invention has been described in detail with particular reference to certain preferred embodiments thereof, but it will be understood that variations and modifications can be effected within the scope of the invention.

PARTS LIST

| | |
|---|---|
| 10 | digital x-ray film grain |
| 12 | crystalline silicon substrate |
| 14 | capacitor plate of first polarity |
| 16 | gate electrode |
| 18 | capacitor plate of second polarity |
| 20 | digital film grain |
| 22 | antenna |
| 24 | metallic layer |
| 26 | insulating layer |
| 28 | p-n junction |
| 30 | field-effect transistor |
| 32 | source |
| 34 | drain |
| 36 | p-type layer |
| 38 | insulating layer |
| 40 | phototransistor |
| 42 | conductive metal layer |
| 44 | n-type amorphous silicon layer |
| 46 | p-type amorphous silicon layer |
| 48 | via |
| 50 | energy storage device |
| 52 | source |
| 54 | drain |
| 56 | central semiconductor |
| 58 | x-ray phosphor layer |
| 62 | photocurrent integrator |
| 64 | analog-to-digital converter |
| 66 | controlling electronics |
| 68 | radio frequency modulator and demodulator |
| 72 | memory for identification number |
| 74 | data memory |
| 80 | base station |
| 82 | antenna of base station |
| 84 | image accumulator |

-continued
PARTS LIST

| | |
|---|---|
| 86a | group of digital film grains |
| 86b | group of digital film grains |
| 86c | group of digital film grains |
| 86d | group of digital film grains |
| 88a | signal repeater |
| 88b | signal repeater |
| 88c | signal repeater |
| 88d | signal repeater |
| 90 | x-ray imaging recorder |
| 92 | matrix |
| 94 | layer |
| 96 | support |
| 200 | digital imaging array |
| 202 | capillary or well |
| 204 | x-ray phosphor |

What is claimed is:

1. A digital film grain for detection of x-rays which comprises:
   a photodetector which produces an electrical signal having a strength which is related to an input x-ray flux;
   a transponder which receives said electrical signal and transmits information quantifying said electrical signal; and
   wherein said digital film grain is disposed in a container and said container contains a material producing a light emission in response to an input radiation flux.

2. A digital film grain as in claim 1 wherein said photodetector is direct radiation detector.

3. A digital film grain as in claim 2 wherein said direct radiation detector is comprised of a layer selected from a group comprised of cadmium telluride, cadmium zinc telluride, lead iodide, mercuric iodide, and amorphous selenium.

4. A digital film grain as in claim 1 wherein said photodetector is an indirect radiation detector.

5. A digital film grain as in claim 1 wherein a luminophor is in proximity to said photodetector.

6. A digital film grain as in claim 1 wherein said transponder comprises a radio frequency generator.

7. A digital film grain as in claim 1 wherein said transponder comprises an antenna.

8. A digital film grain as in claim 1 wherein said transponder comprises a modulator.

9. A digital film grain as in claim 1 wherein said transponder extracts electrical energy from a radiated field to provide electrical power for said digital film grain.

10. A digital film grain as in claim 1 wherein electrical power for said photodetector and said transponder is stored in a capacitor.

11. A digital film grain as in claim 10 wherein said capacitor is located on said digital film grain.

12. A digital film grain as in claim 1 wherein said container is a capillary.

13. A digital film grain as in claim 1 wherein said digital film grain has an individual identifier.

14. A digital film grain as in claim 1 wherein said photodetector is selected from a group comprised of photodiode, charged coupled device (CCD), complementary metal oxide semiconductor (CMOS), phototransistor, and avalanche photodiode.

15. An imaging system comprising:
   a distribution of two or more digital film grains wherein each of said digital film grains comprise a photodetector and transponder;

a base station containing a transponder capable of sending information to and receiving information from to each of said digital film grain transponder; and an image accumulator which assembles signals related to an light flux received at said digital film grains and arranging said signals in an order dependent upon a location of each of said digital grains.

16. A method of acquiring an image by:

detecting an irradiance profile with a distribution of digital film grains;

sending a signal and an identification number from each of said digital film grains to an image accumulator;

determining a location of each of said digital film grains in said distribution;

assembling said signals from said digital film grains in an order according to said location of each of said digital film grain.

17. A method for determining locations of digital film grains in a distribution by:

directing a spot of irradiation to which said distribution is sensitive toward said distribution, wherein at least one dimension of said spot of irradiation is smaller than a smallest distance between said digital film grains;

recording said location of each of said spots of irradiation;

recording signals from said digital film grains in said distribution; and correlating said location of said spot of irradiation to each of said digital film grains sending a signal exceeding a predetermined threshold.

18. A method as in claim 17 comprising:

moving said spot of irradiation to another location and correlating digital film grain signals with location until a set of locations for a substantial fraction of the film grains in said distribution have sent a signal indicating detection of irradiation.

19. A digital film grain for detection of visible light, ultraviolet, or infrared radiation which comprises:

a photodetector which produces an electrical signal having a strength which is related to an input radiation;

a transponder which receives said electrical signal and transmits information quantifying said electrical signal;

wherein components of said digital film grain are fabricated on a single substrate; and wherein spatial dimensions in said substrate are approximately equal with a pixel size of an image produced by an array of said digital film grains.

20. A digital film grain for detection of visible light, ultraviolet, or infrared radiation which comprises:

a photodetector which produces an electrical signal having a strength which is related to an input radiation;

a transponder which receives said electrical signal and transmits information quantifying said electrical signal;

wherein components of said digital film grain are fabricated on a single substrate; and wherein said substrate spatial dimension is 200 $\mu$m or smaller.

* * * * *